(12) United States Patent
Olenick et al.

(10) Patent No.: US 9,792,354 B2
(45) Date of Patent: Oct. 17, 2017

(54) CONTEXT AWARE USER INTERFACE PARTS

(71) Applicant: Microsoft Technology Licensing, LLC, Redmond, WA (US)

(72) Inventors: Brad Olenick, Redmond, WA (US); Christopher Scrosati, Redmond, WA (US); Leon Ezequiel Welicki, Issaquah, WA (US); Steven Sanderson, Bristol (GB); Alvaro Rahul Dias, Bellevue, WA (US); Federico Silva Armas, Seattle, WA (US); Vishal R. Joshi, Redmond, WA (US); Tom Cox, Kenmore, WA (US); Justin Beckwith, Bellevue, WA (US); Jonathan Lucero, Bellevue, WA (US); Kristofer John Owens, Seattle, WA (US); Stephen Michael Danton, Seattle, WA (US); Jonah Bush Sterling, Seattle, WA (US); Dina-Marie Ledonna Supino, Seattle, WA (US); Nafisa Bhojawala, Seattle, WA (US); Madhur Joshi, Kirkland, WA (US); Karandeep Singh Anand, Redmond, WA (US); William J. Staples, Duvall, WA (US); Jesse David Francisco, Lake Stevens, WA (US); Brendyn Alexander, Seattle, WA (US); Julio O. Casal, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 298 days.

(21) Appl. No.: 14/231,862

(22) Filed: Apr. 1, 2014

(65) Prior Publication Data
US 2015/0095811 A1    Apr. 2, 2015

Related U.S. Application Data

(60) Provisional application No. 61/905,128, filed on Nov. 15, 2013, provisional application No. 61/884,743, (Continued)

(51) Int. Cl.
*G06F 3/00* (2006.01)
*G06F 17/30* (2006.01)
(Continued)

(52) U.S. Cl.
CPC ...... *G06F 17/30654* (2013.01); *G06F 3/0481* (2013.01); *G06F 3/0482* (2013.01);
(Continued)

(58) Field of Classification Search
CPC combination set(s) only.
See application file for complete search history.

(56) References Cited

U.S. PATENT DOCUMENTS 5,625,763 A    4/1997 Cirne
5,845,299 A *  12/1998 Arora ............... G06F 17/218
                                                715/209
(Continued)

FOREIGN PATENT DOCUMENTS

EP    1615118    1/2006
WO    WO 02097601 A2    12/2002

OTHER PUBLICATIONS

"International Preliminary Report on Patentability Issued in PCT Application No. PCT/US2014/057938", dated Dec. 23, 2015, 8 Pages.
(Continued)

*Primary Examiner* — Hien Duong
(74) *Attorney, Agent, or Firm* — Workman Nydegger

(57) ABSTRACT

A model for displaying multiple user interface elements such that each control includes a container that includes standard
(Continued)

functionality across at least a majority of the user interface elements. For instance, such standard functionality might include a part status indication, a title, a content status indication, a command invocation function, a part resizing function, and so forth. The model may also provide for standardization of resizing of user interface elements. For a given user interface element, there would be a predetermined number of possible size and shapes, each corresponding to a different projection of data. For instance, all of the user interface elements on a screen may fall within the predetermined number of possible size and shapes, thereby allowing more functional layout of the user interface on the display.

20 Claims, 9 Drawing Sheets

Related U.S. Application Data filed on Sep. 30, 2013, provisional application No. 61/905,111, filed on Nov. 15, 2013, provisional application No. 61/905,243, filed on Nov. 17, 2013, provisional application No. 61/905,114, filed on Nov. 15, 2013, provisional application No. 61/905,116, filed on Nov. 15, 2013, provisional application No. 61/905,129, filed on Nov. 15, 2013, provisional application No. 61/905,105, filed on Nov. 15, 2013, provisional application No. 61/905,247, filed on Nov. 17, 2013, provisional application No. 61/905,101, filed on Nov. 15, 2013, provisional application No. 61/905,119, filed on Nov. 15, 2013.

(51) Int. Cl.
*G06F 9/44* (2006.01)
*G06F 3/0484* (2013.01)
*G06F 17/21* (2006.01)
*G06F 3/0481* (2013.01)
*G06F 3/0482* (2013.01)
*G06F 3/0485* (2013.01)
*G06F 3/0488* (2013.01)
*G06F 9/48* (2006.01)

(52) U.S. Cl.
CPC .......... *G06F 3/0484* (2013.01); *G06F 3/0485* (2013.01); *G06F 3/0488* (2013.01); *G06F 3/04817* (2013.01); *G06F 3/04842* (2013.01); *G06F 8/34* (2013.01); *G06F 9/4443* (2013.01); *G06F 9/4445* (2013.01); *G06F 9/4856* (2013.01); *G06F 17/218* (2013.01); *G06F 17/30398* (2013.01)

(56) References Cited

U.S. PATENT DOCUMENTS

| | | | |
|---|---|---|---|
| 5,886,694 A | 3/1999 | Breinberg et al. | |
| 6,049,812 A | 4/2000 | Bertram et al. | |
| 6,460,060 B1 | 10/2002 | Maddalozzo et al. | |
| 6,473,891 B1 | 10/2002 | Shively | |
| 6,750,887 B1 | 6/2004 | Kellerman et al. | |
| 6,919,890 B2 | 7/2005 | Halstead, Jr. | |
| 6,944,829 B2 | 9/2005 | Dando | |
| 6,950,198 B1 | 9/2005 | Berarducci et al. | |
| 6,950,993 B2 | 9/2005 | Breinberg | |
| 7,062,475 B1 | 6/2006 | Szabo et al. | |
| 7,243,335 B1 | 7/2007 | Andrew | |
| 7,340,721 B1 | 3/2008 | Bailey | |
| 7,401,289 B2 * | 7/2008 | Lachhwani | G06F 17/212 707/E17.116 |
| 7,417,644 B2 | 8/2008 | Cooper et al. | |
| 7,536,672 B1 | 5/2009 | Ruehle | |
| 7,577,938 B2 | 8/2009 | Bent et al. | |
| 7,624,342 B2 * | 11/2009 | Matveyenko | G06F 17/2247 715/255 |
| 7,669,140 B2 * | 2/2010 | Matthews | G06F 9/4418 707/705 |
| 7,730,418 B2 | 6/2010 | Wang et al. | |
| 7,769,794 B2 | 8/2010 | Moore et al. | |
| 7,823,077 B2 | 10/2010 | Kurtz et al. | |
| 7,933,632 B2 | 4/2011 | Flynt et al. | |
| 7,954,064 B2 | 5/2011 | Forstall et al. | |
| 8,095,412 B1 | 1/2012 | Zias et al. | |
| 8,181,156 B1 | 5/2012 | Bobykin | |
| 8,195,646 B2 | 6/2012 | Evans et al. | |
| 8,316,323 B2 | 11/2012 | Saraiya et al. | |
| 8,321,847 B1 | 11/2012 | Garvin et al. | |
| 8,365,138 B2 | 1/2013 | Iborra et al. | |
| 8,453,065 B2 | 5/2013 | Chaudhri et al. | |
| 8,533,667 B2 | 9/2013 | Alexander et al. | |
| 8,543,824 B2 | 9/2013 | Louch et al. | |
| 8,856,681 B2 | 10/2014 | Rodden et al. | |
| 8,869,027 B2 | 10/2014 | Louch et al. | |
| 8,990,199 B1 | 3/2015 | Ramesh | |
| 9,152,616 B2 * | 10/2015 | Ying | G06F 17/2247 |
| 9,195,477 B1 | 11/2015 | Spencer | |
| 9,244,661 B1 | 1/2016 | Garvin et al. | |
| 9,244,971 B1 | 1/2016 | Kalki | |
| 2002/0105658 A1 | 8/2002 | Jackson et al. | |
| 2002/0138637 A1 | 9/2002 | Suzuoki et al. | |
| 2002/0147963 A1 | 10/2002 | Lee | |
| 2003/0011638 A1 | 1/2003 | Chung | |
| 2003/0058286 A1 | 3/2003 | Dando | |
| 2003/0090504 A1 | 5/2003 | Brook et al. | |
| 2003/0137540 A1 | 7/2003 | Klevenz et al. | |
| 2003/0210274 A1 | 11/2003 | Subramanian et al. | |
| 2004/0098390 A1 | 5/2004 | Bayliss et al. | |
| 2004/0225581 A1 | 11/2004 | Wyle et al. | |
| 2004/0243576 A1 | 12/2004 | Shrivastava et al. | |
| 2005/0088410 A1 | 4/2005 | Chaudhri | |
| 2005/0125727 A1 | 6/2005 | Ramachandran et al. | |
| 2005/0131889 A1 | 6/2005 | Bennett et al. | |
| 2005/0177586 A1 | 8/2005 | Chen | |
| 2005/0188349 A1 | 8/2005 | Bent et al. | |
| 2006/0048071 A1 | 3/2006 | Jarrett et al. | |
| 2006/0053096 A1 | 3/2006 | Subramanian et al. | |
| 2006/0190833 A1 | 8/2006 | SanGiovanni et al. | |
| 2006/0253799 A1 | 11/2006 | Montroy | |
| 2006/0282771 A1 | 12/2006 | Vinci | |
| 2007/0024646 A1 | 2/2007 | Saarinen et al. | |
| 2007/0027851 A1 | 2/2007 | Kruy | |
| 2007/0033522 A1 * | 2/2007 | Lin | G06F 9/4443 715/202 |
| 2007/0094326 A1 | 4/2007 | Gupta | |
| 2007/0136579 A1 | 6/2007 | Levy et al. | |
| 2007/0156740 A1 | 7/2007 | Leland et al. | |
| 2007/0162439 A1 | 7/2007 | Petropoulos et al. | |
| 2007/0209023 A1 | 9/2007 | Nakagawa et al. | |
| 2007/0233854 A1 * | 10/2007 | Bukovec | H04L 43/045 709/224 |
| 2007/0234195 A1 | 10/2007 | Wells | |
| 2007/0288667 A1 | 12/2007 | Kamata et al. | |
| 2008/0065974 A1 | 3/2008 | Campbell | |
| 2008/0066080 A1 * | 3/2008 | Campbell | G06F 17/3089 719/314 |
| 2008/0109714 A1 | 5/2008 | Kumar et al. | |
| 2008/0109785 A1 | 5/2008 | Bailey | |
| 2008/0144119 A1 | 6/2008 | Otake | |
| 2008/0177994 A1 | 7/2008 | Mayer | |
| 2008/0201401 A1 | 8/2008 | Pugh et al. | |
| 2008/0235618 A1 | 9/2008 | Sadouski | |
| 2008/0313648 A1 | 12/2008 | Wang et al. | |
| 2008/0320413 A1 * | 12/2008 | Oshiro | G06F 3/0481 715/792 |
| 2009/0037605 A1 | 2/2009 | Li | |
| 2009/0055432 A1 | 2/2009 | Smith | |
| 2009/0106227 A1 | 4/2009 | Davis | |
| 2009/0119257 A1 | 5/2009 | Waters | |
| 2009/0254337 A1 | 10/2009 | Sprecher et al. | |

(56) References Cited

U.S. PATENT DOCUMENTS

| | | | |
|---|---|---|---|
| 2009/0254822 A1 | 10/2009 | Greenlee | |
| 2009/0292989 A1 | 11/2009 | Matthews | |
| 2009/0319939 A1 | 12/2009 | Danton et al. | |
| 2010/0005053 A1 | 1/2010 | Estes | |
| 2010/0058227 A1 | 3/2010 | Danton et al. | |
| 2010/0115053 A1 | 5/2010 | Ryu et al. | |
| 2010/0174774 A1 | 7/2010 | Kern et al. | |
| 2010/0229115 A1* | 9/2010 | Augustine | G06F 3/1454 715/800 |
| 2010/0251143 A1* | 9/2010 | Thomas | G06F 17/3089 715/760 |
| 2010/0262905 A1 | 10/2010 | Li | |
| 2010/0269096 A1 | 10/2010 | Araya | |
| 2010/0287530 A1 | 11/2010 | MacLean et al. | |
| 2010/0306696 A1* | 12/2010 | Groth | G06F 3/0481 715/800 |
| 2011/0173537 A1 | 7/2011 | Hemphill | |
| 2011/0289546 A1 | 11/2011 | Pieczul et al. | |
| 2012/0005581 A1 | 1/2012 | Turner | |
| 2012/0023442 A1 | 1/2012 | Oshiro et al. | |
| 2012/0030591 A1 | 2/2012 | Demant et al. | |
| 2012/0079379 A1 | 3/2012 | Hathaway et al. | |
| 2012/0124555 A1 | 5/2012 | Bannoura et al. | |
| 2012/0151361 A1 | 6/2012 | Burton | |
| 2012/0167008 A1* | 6/2012 | Zaman | G06F 3/048 715/814 |
| 2012/0191502 A1 | 7/2012 | Gross et al. | |
| 2012/0206498 A1 | 8/2012 | Kai et al. | |
| 2012/0246487 A1 | 9/2012 | Gu et al. | |
| 2012/0254723 A1 | 10/2012 | Kasa et al. | |
| 2012/0324422 A1 | 12/2012 | Chartier et al. | |
| 2012/0330668 A1 | 12/2012 | Verna et al. | |
| 2012/0331441 A1 | 12/2012 | Adamson | |
| 2013/0086508 A1 | 4/2013 | Oguz | |
| 2013/0120295 A1 | 5/2013 | Kim et al. | |
| 2013/0139056 A1 | 5/2013 | Borkowski et al. | |
| 2013/0145314 A1 | 6/2013 | Dhar et al. | |
| 2013/0191880 A1 | 7/2013 | Conlan et al. | |
| 2013/0219263 A1* | 8/2013 | Abrahami | G06F 17/211 715/234 |
| 2013/0247006 A1 | 9/2013 | Trowbridge | |
| 2013/0300758 A1* | 11/2013 | Yerli | G06T 11/206 345/581 |
| 2014/0258970 A1 | 9/2014 | Brown et al. | |
| 2014/0298253 A1 | 10/2014 | Jin et al. | |
| 2014/0366157 A1 | 12/2014 | Yancey et al. | |
| 2015/0058709 A1 | 2/2015 | Zaletel | |
| 2015/0149937 A1 | 5/2015 | Khalid et al. | |

OTHER PUBLICATIONS

"International Preliminary Report on Patentability Issued in PCT Application No. PCT/US2014/057323", dated Dec. 23, 2015, 7 Pages.
"International Preliminary Report on Patentability Issued in PCT Application No. PCT/US2014/057940", dated Dec. 23, 2015, 9 Pages.
Office Action dated Feb. 16, 2016 cited in U.S. Appl. No. 14/231,883.
Office Action dated Feb. 26, 2016 cited in U.S. Appl. No. 14/231,891 Attached).
"International Preliminary Report on Patentability Issued in PCT Application No. PCT/US2014/057938", dated Sep. 17, 2015, 7 Pages.
Kumar, Dhananjay, "Live Tiles in XAML based Windows 8 Metro Application", Published on: Mar. 29, 2012, Available at: http://debugmode.net/2012/03/29/lives-tiles-in-xaml-based-windows-8-metro-application/.
Thurrott, Paul, "Windows 8 Feature Focus: Live Tiles", Published on: Jan. 28, 2013, Available at: http://winsupersite.com/article/windows8/windows-8-feature-focus-live-tiles-144652.

"International Search Report and Written Opinion Received for PCT Patent Application No. PCT /US2014/057323", dated Dec. 10, 2014, 8 Pages.
"International Search Report & Written Opinion Received for PCT Patent Application No. PCT/US2014/057940", dated Jan. 12, 2015, 10 Pages.
"ACC97: How to Modify Query Properties in Microsoft Access", Available at least as early as Jan. 13, 2015, Available at <<http://support.microsoft.com/kb/304451>>.
Brydon, Michael, "Access Tutorial: Parameter Queries", Published Aug. 1997, Available at <<http:/fisher.osu.edu/~muhanna.1/837/MSAccess/tutorials/param.pdf>>.
International Search Report and Written opinion Issued in PCT Patent Application No. PCT/US2014/057322, dated Jan. 22, 2015, 9 Pages.
International Search Report and Written Opinion Issued in PCT Application No. PCT/US2014/057938, dated Feb. 6, 2015, 11 Pages.
International Search Report & Written Opinion for PCT Patent Application No. PCT/US2014/057321, dated Feb. 6, 2015, 8 Pages.
"International Preliminary Report on Patentability Issued in PCT Application No. PCT/US2014/057324", dated Aug. 5, 2015, 6 pages.
Second Written Opinion Issued in PCT Patent Application No. PCT/US2014/057321, dated Aug. 7, 2015, 6 Pages.
"W3C Technical Reports", Published Nov. 11, 1999, 8 Pages. Available at <<http://www.w3.org/Consortium/Process/Process-19991111.tr.html#RecsCR>>.
Second Written Opinion Issued in PCT Application No. PCT/US2014/057940, dated Aug. 27, 2015, 8 Pages.
"International Preliminary Report on Patentability Issued in PCT Application No. PCT/US2014/057321", dated Dec. 4, 2015, 7 Pages.
"International Preliminary Report on Patentability Issued in PCT Application No. PCT/US2014/057939", dated Dec. 4, 2015, 5 Pages.
Office Action dated Jan. 29, 2016 cited in U.S. Appl. No. 14/231,869.
Office Action dated Feb. 1, 2016 cited in U.S. Appl. No. 14/231,880.
"International Preliminary Report on Patentability Issued in PCT Patent Application No. PCT/US2014/057322", dated Jan. 12, 2016, 6 Pages.
International Search Report and Written Opinion Issued in PCT Application No. PCT/US2014/057324, dated Jun. 24, 2015, 5 Pages.
Second Written Opinion Issued in PCT Application No. PCT/US2014/057939, dated Jun. 24, 2015, 4 Pages.
W3c: "HTML5—A Vocabulary and Associated APIs for HTML and XHTML", Published Aug. 6, 2013, Available at <<http://www.w3.org/TR/2013/CR-html5-20130806/embedded-content-0.html#the-iframe-element>>.
"International Search Report and Written Opinion Received for PCT patent Application No. PCT/US2014/057939" dated Dec. 1, 2014, 8 pages.
"International Search Report and Written Opinion Received for PCT patent Application No. PCT/US2014/057324" dated Dec. 1, 2014, 8 pages.
U.S. Appl. No. 14/231,883, May 24, 2016, Office Action.
U.S. Appl. No. 14/231,846, Jun. 14, 2016, Office Action.
U.S. Appl. No. 14/231,897, Jun. 2, 2016, Office Action.
U.S. Appl. No. 14/231,905, Jun. 14, 2016, Office Action.
Office Action dated Jan. 11, 2017 cited in U.S. Appl. No. 14/231,917.
Office Action dated Aug. 17, 2016 cited in U.S. Appl. No. 14/231,869.
Notice of Allowance dated Aug. 29, 2016 cited in U.S. Appl. No. 14/231,883.
Office Action dated Sep. 23, 2016 cited in U.S. Appl. No. 14/231,846.
Office Action dated Nov. 2, 2016 cited in U.S. Appl. No. 14/231,905.
Office Action dated Nov. 17, 2016 cited in U.S. Appl. No. 14/231,912.

(56) References Cited

OTHER PUBLICATIONS

Office Action dated Sep. 6, 2016 cited in U.S. Appl. No. 14/231,880.
Office Action dated Sep. 9, 2016 cited in U.S. Appl. No. 14/231,873.
Office Action dated Sep. 16, 2016 cited in U.S. Appl. No. 14/231,897.
Notice of Allowance dated Jun. 20, 2016 cited in U.S. Appl. No. 14/231,891.
Office Action dated Feb. 24, 2017 cited in U.S. Appl. No. 14/231,897.
Office Action dated Apr. 3, 2017 cited in U.S. Appl. No. 14/231,880.
Ray, Li, France, Kim "Using UML to Visualize Role-Based Access Control Constraints" published Jun. 2004. Computer Science Dept. Colorado State University Fort Collings, CO—SACMAT'04, Yorktown Heights, New York, USA.
Notice of Allowance dated Mar. 29, 2017 cited in U.S. Appl. No. 14/231,905.
Notice of Allowance dated Feb. 13, 2017 cited in U.S. Appl. No. 14/231,869.
Office Action Issued in Chile Patent Application No. 729-2016, dated May 17, 2017, 6 pages.
U.S. Appl. No. 14/231,897, Jun. 16, 2017, Notice of Allowance.
U.S. Appl. No. 14/231,912, Jun. 16, 2017, Office Action.
U.S. Appl. No. 14/231,846, Jul. 12, 2017, Office Action.
European Office Action issued in EPO Patent Application No. 14783733.0 dated May 22, 2017.
U.S. Appl. No. 14/231,873, May 17, 2017, Office Action.

\* cited by examiner

CONTEXT AWARE USER INTERFACE PARTS

CROSS-REFERENCE TO RELATED APPLICATIONS

This application claims the benefit of each of the following provisional patent applications, and each of the following provisional patent applications are incorporated herein by reference in their entirety:
1. U.S. Provisional Application Ser. No. 61/905,111, filed Nov. 15, 2013;
2. U.S. Provisional Application Ser. No. 61/884,743, filed Sep. 30, 2013;
3. U.S. Provisional Application Ser. No. 61/905,243, filed Nov. 17, 2013;
4. U.S. Provisional Application Ser. No. 61/905,114, filed Nov. 15, 2013;
5. U.S. Provisional Application Ser. No. 61/905,116, filed Nov. 15, 2013;
6. U.S. Provisional Application Ser. No. 61/905,129, filed Nov. 15, 2013;
7. U.S. Provisional Application Ser. No. 61/905,105, filed Nov. 15, 2013;
8. U.S. Provisional Application Ser. No. 61/905,247, filed Nov. 17, 2013;
9. U.S. Provisional Application Ser. No. 61/905,101, filed Nov. 15, 2013;
10. U.S. Provisional Application Ser. No. 61/905,128, filed Nov. 15, 2013; and
11. U.S. Provisional Application Ser. No. 61/905,119, filed Nov. 15, 2013.

BACKGROUND

A current paradigm for navigating through various information contexts is windows based. A classic example of this is the web browser experience. A user might begin with a home page that occupies the entire browser space. The user might then select a hyperlink, whereupon a new window appears. However, the previous window either disappears or, in the case of exercising an option to open the new page in a new window, the previous window is fully, or at least partially, hidden.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

At least some embodiments described herein relate to a model for displaying multiple user interface elements that have controls projecting data thereinto. The model displays the multiple user interface elements such that each control includes a container that includes standard functionality across at least a majority of the user interface elements. For instance, such standard functionality might include a part status indication, a title, a content status indication, a command invocation function, a part resizing function, and so forth.

At least some embodiments described herein relate to the standardization of resizing of user interface elements. In particular, for a given user interface element, there would be a predetermined number of possible size and shapes, each corresponding to a different projection of data. For instance, a smaller size user interface element may project data in a different way and perhaps have a smaller amount of data projected than a larger incarnation of the user interface element. In some embodiments, all of the user interface elements on a screen may fall within the predetermined number of possible size and shapes, thereby allowing more functional layout of the user interface on the display.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

For instance.

DETAILED DESCRIPTION

At least some embodiments described herein relate to a model for displaying multiple user interface elements that have controls projecting data thereinto. The model displays the multiple user interface elements such that each control includes a container that includes standard functionality across at least a majority of the user interface elements. For instance, such standard functionality might include a part status indication, a title, a content status indication, a command invocation function, a part resizing function, and so forth.

At least some embodiments described herein relate to the standardization of resizing of user interface elements. In particular, for a given user interface element, there would be a predetermined number of possible size and shapes, each corresponding to a different projection of data. For instance, a smaller size user interface element may project data in a different way and perhaps have a smaller amount of data projected than a larger incarnation of the user interface element. In some embodiments, all of the user interface elements on a screen may fall within the predetermined number of possible size and shapes, thereby allowing more functional layout of the user interface on the display.

The principles described herein may be implemented using a computing system. For instance, the users may be engaging with the system using a client computing system. The executable logic supporting the system and providing visualizations thereon may also be performed using a computing system. The computing system may even be distributed. Accordingly, a brief description of a computing system will now be provided.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. An example computing system is illustrated in FIG. 1.

Figure 1:
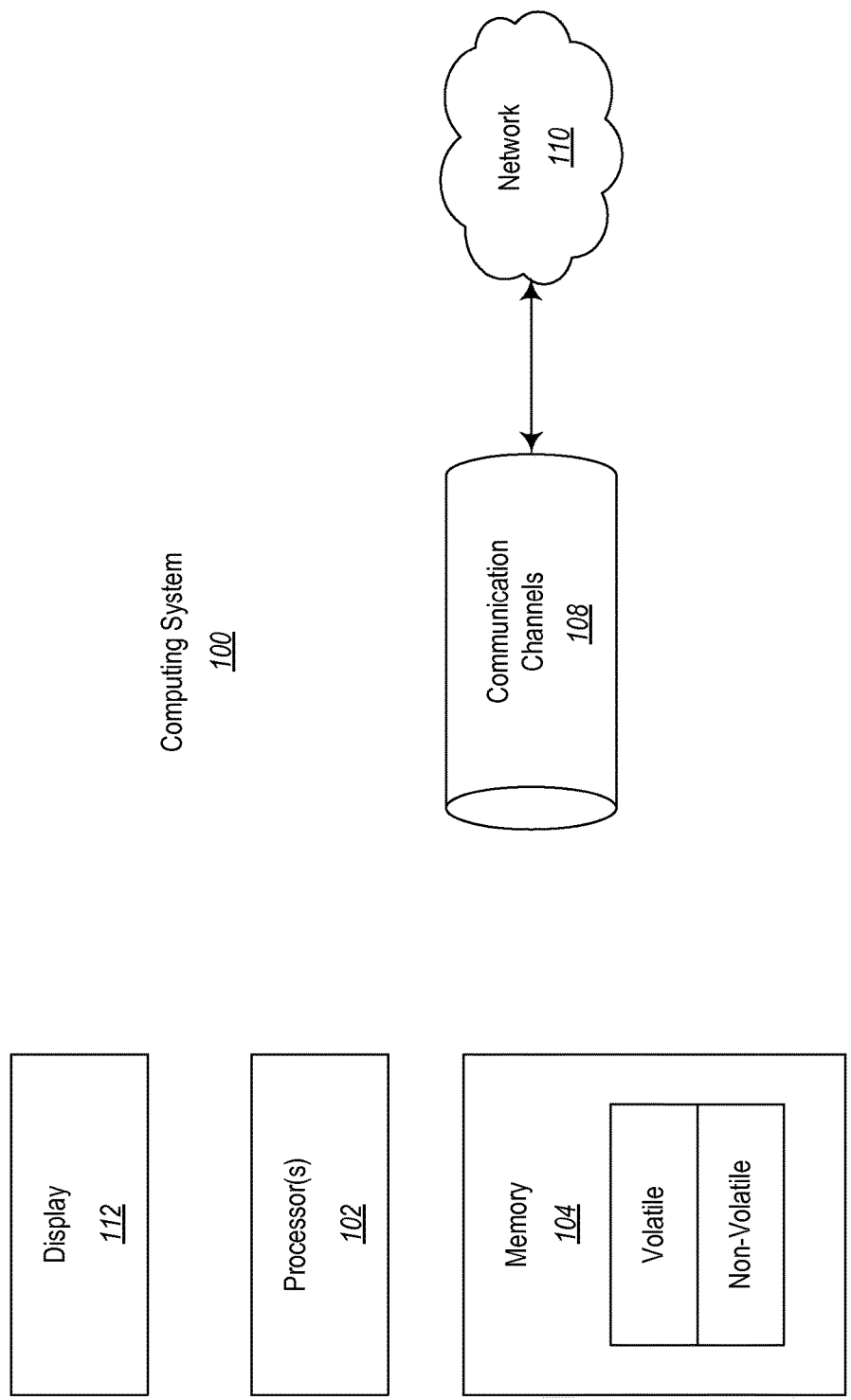
FIG. 1 abstractly illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

The computing system 100 also includes a display 112 on which a user interface, such as the user interfaces described herein, may be rendered. Such user interfaces may be generated in computer hardware or other computer-represented form prior to rendering. The presentation and/or rendering of such user interfaces may be performed by the computing system 100 by having the processing unit(s) 102 execute one or more computer-executable instructions that are embodied on one or more computer-readable media. Such computer-readable media may form all or a part of a computer program product.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments described herein relate to a user interface element (also called herein a "part") that has a number of benefits. A "part" is a computer-recognized artifact that that projects controls into the screen (e.g., into the display 112 of the computing system 100). A control is an executable component for projecting a user interface element in the screen. A part is a composition of one or more controls that are configured to execute with a particular computing execution context called herein a "system".

As will be described herein, a system presents a user interface (also called herein a "portal" on a display (such as the display 112 of FIG. 1). The system may have one or more applications running therein. The system may be thought of as an operating system, in which case the one or more applications are simply applications running in the operating system. On the other hand, the system may also itself be just an application (such as a web browser), in which case the applications that run within the system may be thought of as "extensions" to the application. In the description and in the claims, such an "extension" will be termed an "application".

Application developers can create their own parts (extrinsic parts) or use the parts (intrinsic parts) provided by the system. The intrinsic parts are included within a library of available parts. The extrinsic parts may also use the intrinsic system controls (such as display in multiple sizes, deal with errors, show progress, and so forth) and combined multiple of the existing controls. The parts have standard rich functionality (such as display in multiple sizes, error handling, progress indication, and so forth).

The parts can be combined into "lenses" that are group of parts that can be treated as a unit. Lenses are defined by the extension developers and are group of parts. The lenses provide a way of grouping and moving around sets of parts as a single unit.

A part provides a wide set of capabilities to application developers to surface user experience in a consistent manner. These capabilities may include responsiveness (the ability to react and adapt to multiple display sizes), automatic snapping to layout, surfacing of different states (e.g. executing, loading, progress bars, etc.) in a consistent way, blocking so no further interaction can be done, surfacing consistent error information and conditions, being associated with an asset in the system and then react to life-cycle events for the assets (e.g. do the right thing if the asset is deleted), status reporting, mutating to a different part, consistency of the user experience across the system, shared parts between extension, sanitization of code, and so forth.

The parts provide a convenient model for creating units of user interface. Developers can provide a template and a view model that will take advantage of these available capabilities. In addition, all the code provided by the application developer will be consistent by construction as the code will be sanitized (e.g. will only allow safe script and styles).

The parts provide a programming model that application developers can use to project units of user interface into the portal. Every part follows certain coding patterns to be able to be part of that model, which ensures uniformity in the code, reuse of core functionality and consistent and predictable results in the user experience.

In one embodiment, a part may be authored as a combination of a template (e.g., regular markup, such as HTML5 and knockout.js), style (CSS3), and code (a view model in TypeScript). There are rules that ensure that authors provide consistent and predictable user experience. For the markup, css, and knockout bindings the system has a "sanitization" component, which is basically a compile-time processing step that removes all code or styles that can be potentially harmful. The rules for the sanitization are owned by the core portal (this is the portal team). By doing this application developers can use familiar tools to write the parts (e.g. HTML5, knockout, and CSS) and do not need to learn new languages.

The other aspect of the part is the code (also called herein the "the view model") that can be executed to setup/construct the part or as the result of a user interaction. That code is executed using the portal isolation system (so it does not affect the overall portal). In that view model application, authors can write any valid TypeScript/JavaScript (e.g. compute, retrieve data, transform data, etc.). The template reacts to changes in the view model, enabling rich and reactive patterns (e.g. parts that are updated as new data is available). Even though part developers have a lot of freedom as to how to write their parts, there are certain patterns that they need to follow.

Every part has a "container" (which is passed to the actual part implementation at the constructor) that is its tie to the shell where they can influence standard behavior with any other existing part. For example, using the container the extension developers can move from one state of the part to the other. This means that they can provide a consistent "loading state" (e.g. the part shows a progress bar and does not allow interaction) just by calling a method in that container and without the need of writing that code themselves (which is prone to errors and UX inconsistencies). Some of the capabilities include showing loading state, moving to failure state (e.g. errors), executing operations, block all UI interactions, display title and subtitle, and show overall state visually (to call some of the main capabilities).

Figure 2A:
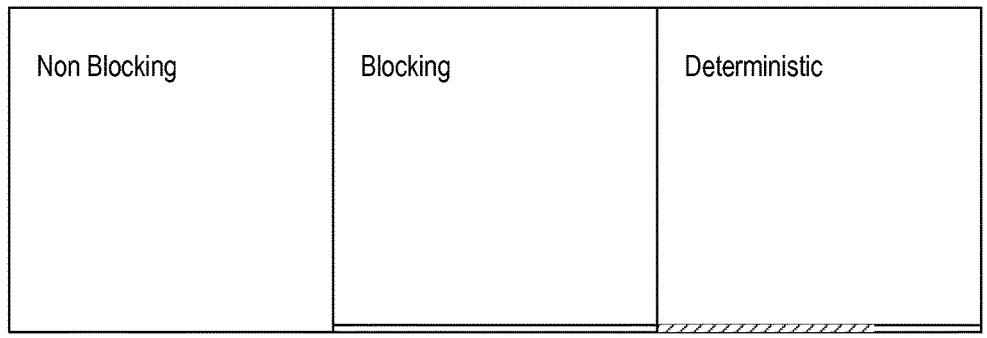
FIG. 2A illustrates several part states manifest by a standard functionality of a container, including a non-blocking part status, a blocking part status, and a processing indication status.
Figure 2B:
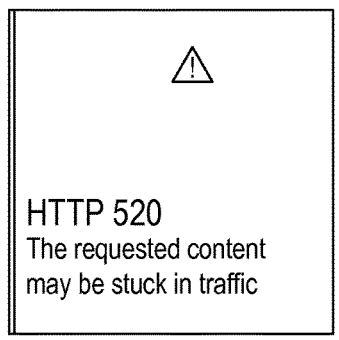
FIG. 2B illustrates an error part status expressed by a standard functionality of a container.

For instance, FIG. 2A illustrates several part states manifest by the part in one example. The left part shows a part have a regular status. The middle part shows a blocked part (no user interaction) with a non-deterministic progress bar at the bottom. The right part shows a part with a deterministic progress bar at the bottom. FIG. 2B illustrates a part in a failed state. Such part status indication may be a standard function of the container, and thus be provided consistently across all (or at least a majority of) parts.

Figure 3:
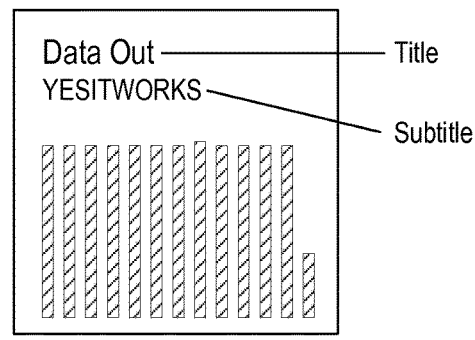
FIG. 3 illustrates a part displaying a title and subtitle, which appear consistent throughout all (or a majority of) parts as provided by a standard functionality of a container.

FIG. 3 illustrates a part displaying a title and subtitle, which appear consistent throughout all (or a majority of) parts. For instance, the title may have the same font, size, color, and position for all parts. Likewise, the subtitle may have the same font, size, color, and position for all parts. Accordingly, the title and subtitle presentation may be part of the container, and thus part of the standard functionality offered across all (or a majority of) parts.

Figure 4:
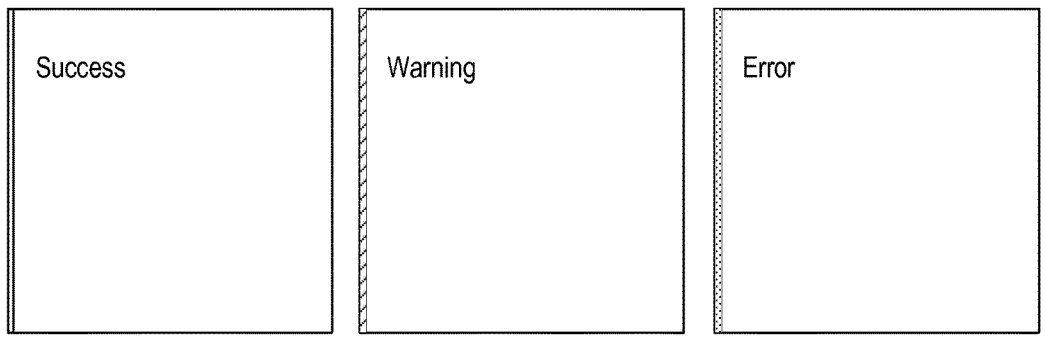
FIG. 4 illustrates a part with various content states provided by a container of a part, the content states including a success content status, a warning content status, and an error content status.

FIG. 4 illustrates parts with various content statuses. Note that the content status often refers to the status of its underlying resource. For instance, error does not mean that the part is in error (an error state for a part itself is shown in FIG. 2). Instead, the error can mean that the underlying website represented by the part is in an error state.

In addition to the consistency mentioned above (surfacing status and information), the part infrastructure is designed to fit well with the portal layout model. Parts automatically display correctly in a grid. As we mentioned above, parts support also multiple sizes. Application developers can decide what sizes they want to support and can provide different user experiences for each size. In other words, depending on the part, different data may be projected in different ways within the part.

Figure 5:
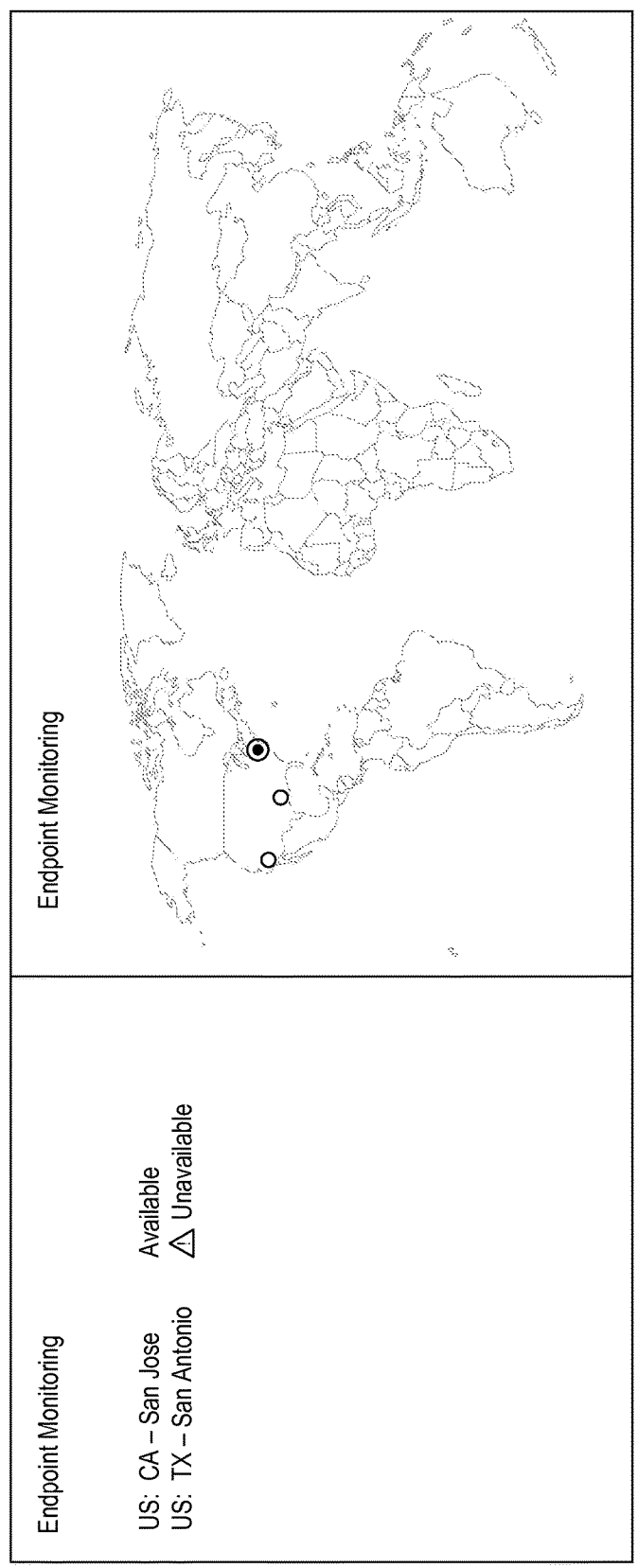
FIG. 5 shows two instances of an endpoint monitoring part, which shows that different data is projected differently depending on the size of the part.

For instance, FIG. 5 shows two instances of an endpoint monitoring part. In the left instance 500A, the part is small, and thus a smaller mount of data is projected into the part. In the right instance 500B, the part is larger, and thus a larger amount of data is projected into the part, and in a way that allows more detail to be viewed. Thus, resizing an user interface element is much more complex that simply making a user interface element larger or smaller.

The supported parts are provided by the portal (so it is a consistent list designed to be fit well with the layout engine). As a result of this, extension developers (the portal extension authors) can create their blades using parts in different sizes based on the available real state and the importance of the information that they want to convey. Users can later decide if they want to resize the part, and if so, they can change the size of the part to any of the supported sizes (see FIG. 5).

Figure 6:
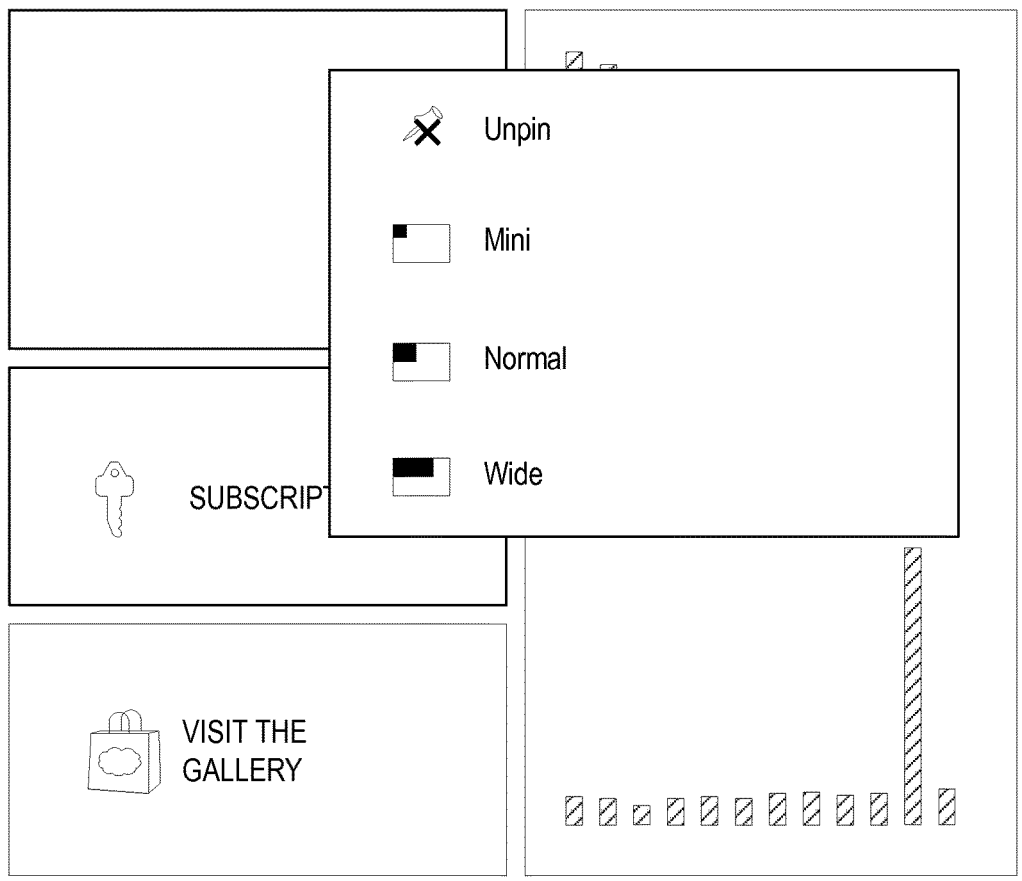
FIG. 6 illustrates a part having a context menu as part of a standard functionality of a container.

In FIG. 6, the context menu allows user to select one of the available sizes for the selected part. Once the size is selected the part is rendered in that size. Note that each part has a predetermined number of sizes. For instance, all parts might be subject to a predetermined set of selectable sizes, thereby allowing the parts to fit well within a grid pattern.

Figure 7:
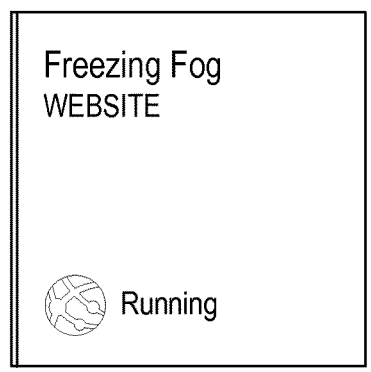
FIG. 7 illustrates a part that represents a web site.

Parts can be associated with assets in the portal. For instance, a part that represents a web site is illustrated in FIG. 7. Note how the name, type of resource, type of icon, and status are surfaced in the part.

Figure 8:
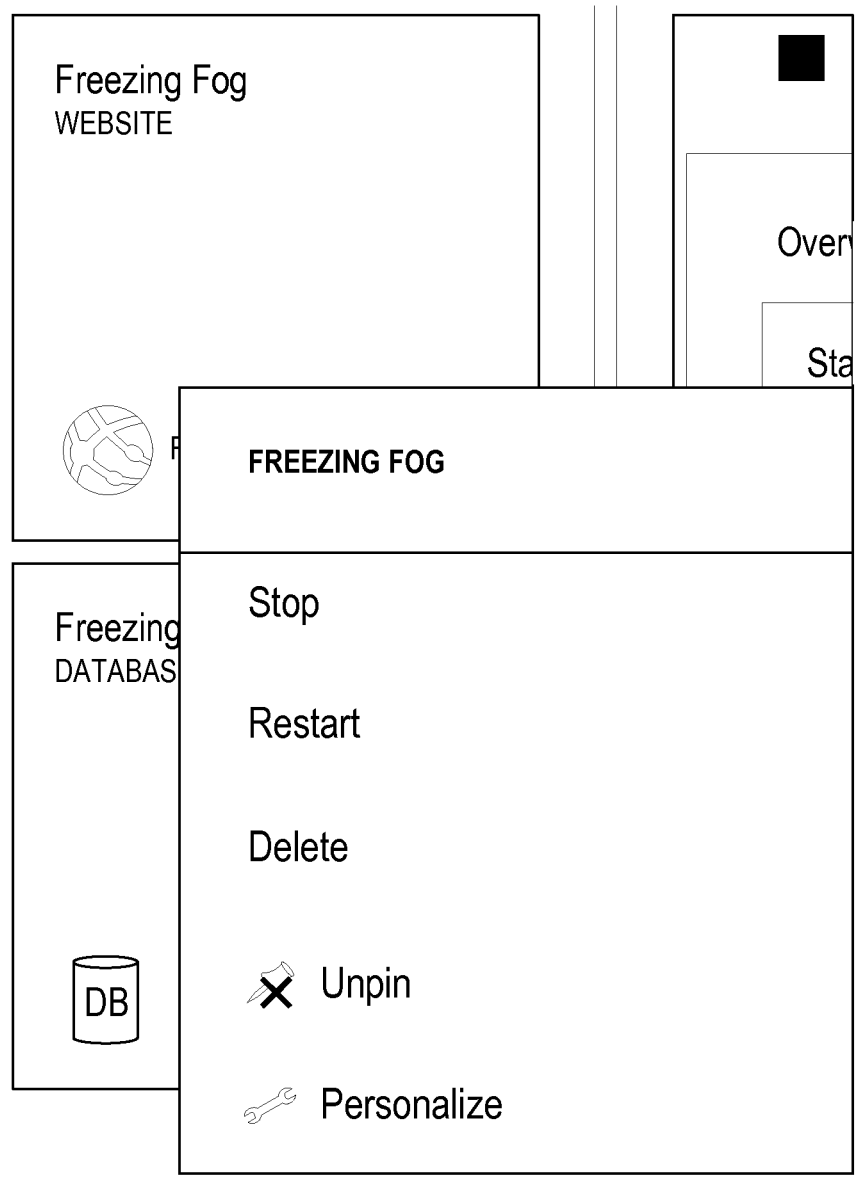
FIG. 8 illustrates a command menu provided as part of a standard functionality provided by a container.

This means that the part can surface live information about that resource (e.g. status) and offer the users the commands associated with the asset (e.g. stop, start, delete the website, as in FIG. 8). Accordingly, command invocation functions may also be part of the standard functionality offered by the container to each part.

In addition, if the resource has been deleted the part can be removed or show a "resource" deleted user experience (this is all done by the portal without the need of part author intervention). Those parts also can initiate the main flow associated to the resource, so they are both an actual representation of that resource and a way of starting the journey associated to the resource.

Figure 9:
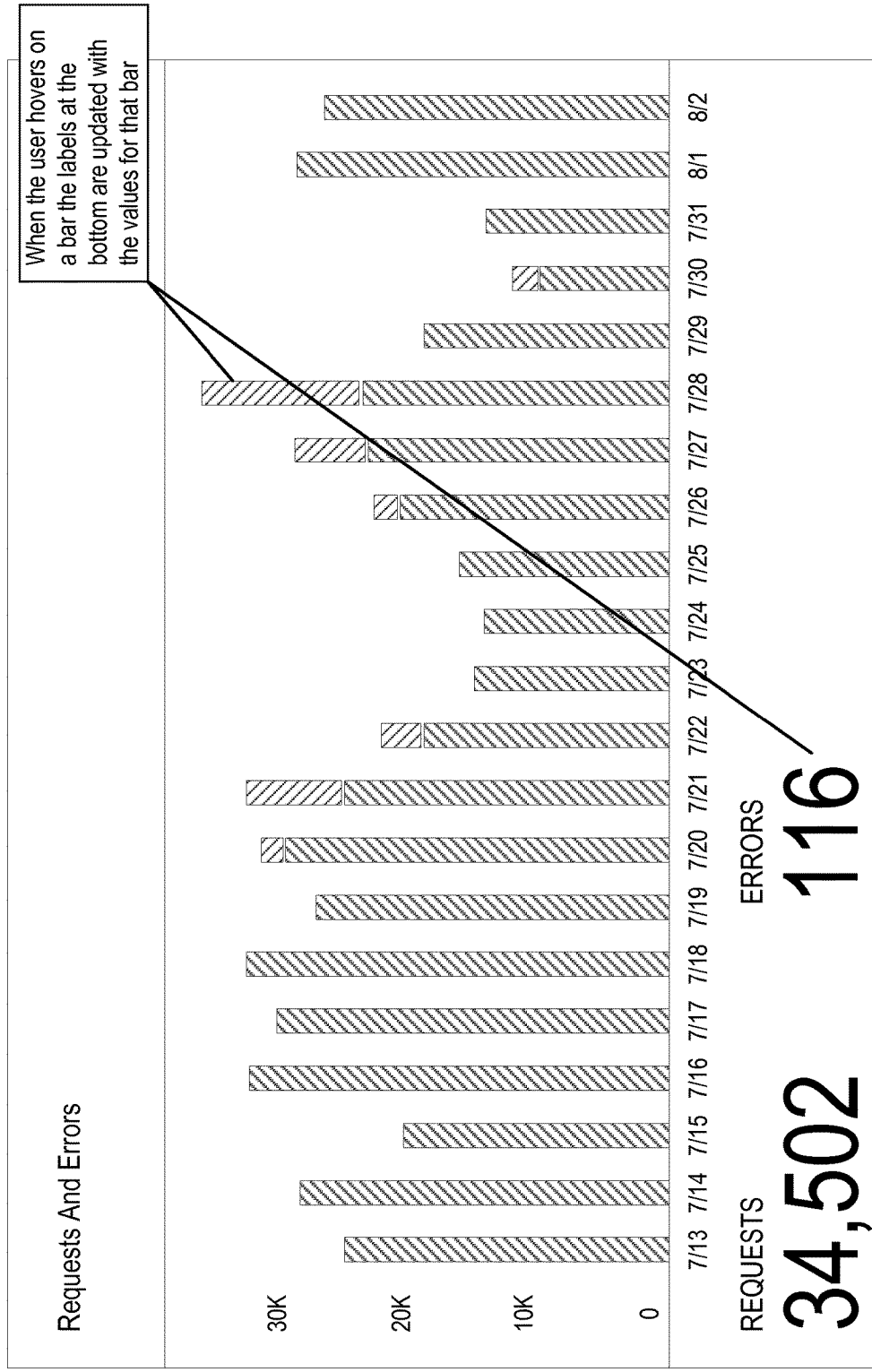
FIG. 9 illustrates a part in which the user may interact with elements in the part in a complex way.

Part authors can create complex interactions within their parts. For example, a part author may decide to have a chart that hovered or clicked updates the value of labels below the chart (see FIG. 9) or a chart that when a single bar is clicked goes to another blade.

Part authors can define "hot spots" in their parts (that are interactive regions within the part) that can result in changes to the underlying view model that can change what is surfaced in the part (remember that the parts are reactive, so changes in the view model are observably pushed to the template). The portal also offers a rich selection model, which parts can leverage (resulting again in consistent behavior across the board and less code to write for the part authors)

Figure 10:
FIG. 10 illustrates a part as it morphs into various states during the creation of a resource.

In some cases, part are to change their visual representation to something else. For example, a part that represents a resource being provisioned will change to the actual resource once the provisioning is completed (see FIG. 10).

Another example is setting continuous deployment in a website: if it is not set, the part to "set continuous deployment" is displayed, but once it is set the actual continuous deployment is displayed. The set of available changes are scenario specific are controlled and limited by the system.

As part of the portal, parts are also participants in the binding system. This means that they can offer/receive data from other parts or user interface elements. As a result of this, parts can also react to changes or events that happen in other parts of the portal. For example, we can have a blade with several charts that show requests over a period of time and a part at the top where a user can set the time period. When the time period is changed (e.g. from 1 day to 7 days) all the parts react to that change and their charts display the last seven days. As a result of this, parts can be part of a rich ecosystem and support/enable rich experiences that go beyond the confines of its actual widget.

Figure 11:
FIG. 11 illustrates an example management user interface for managing a website and database together, and in which up-to-date status of the deployments of the website may be evaluated.

Applications can expose their parts to be used by other applications. By a rich ecosystem may be provided where different applications can contribute to provide rich experiences. For example, we can create a user interface element with a set of website parts (provided by the Websites application), a database part that shows the database associated with the site (provided by the database application) and a continuous deployment part (provided by TFS). For instance, in the user interface element of FIG. 11, the website and database may be managed together, and up-to-date status of the deployments of the website may be evaluated.

Figure 12:
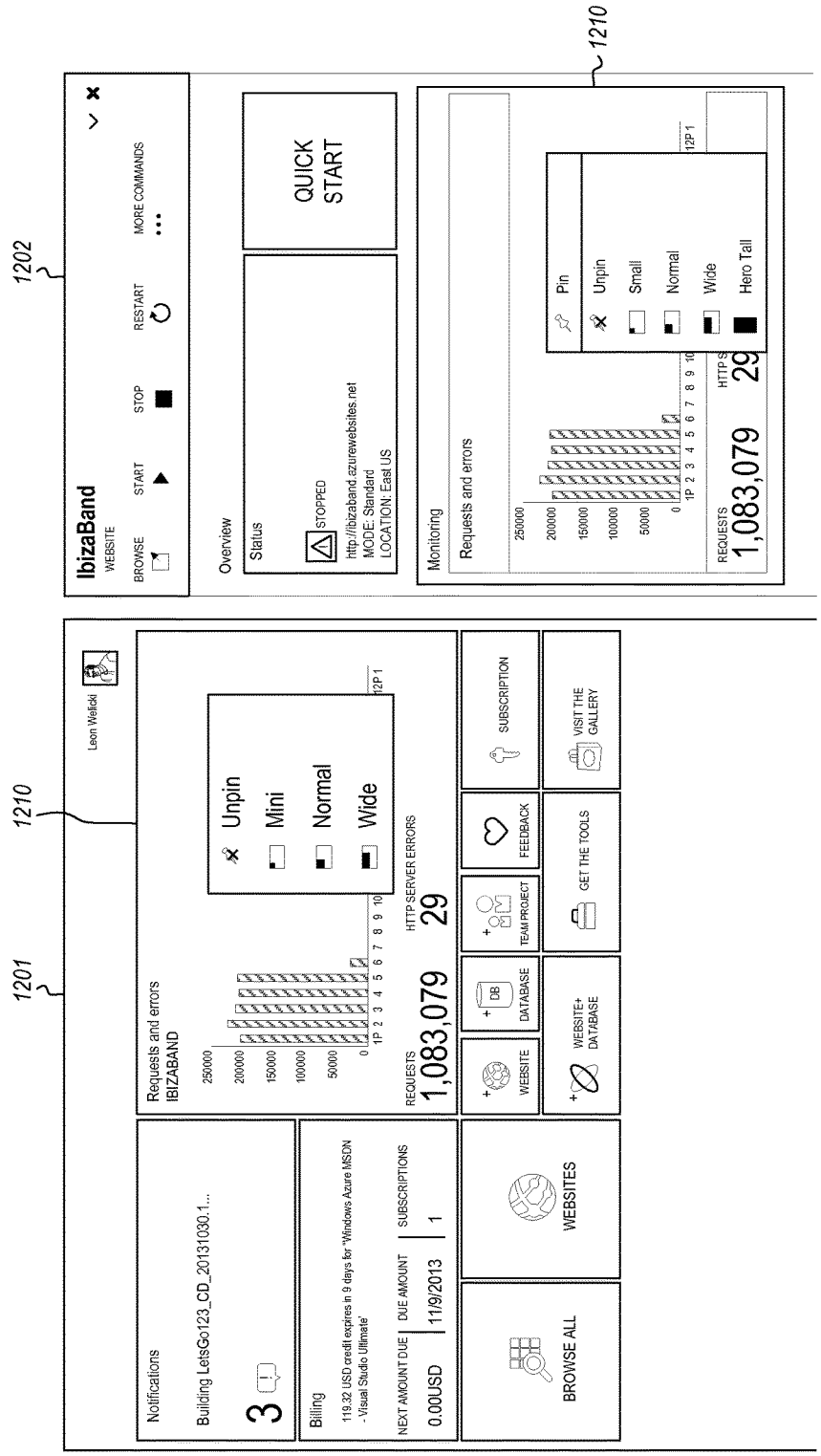
FIG. 12 shows two different contexts for a part and illustrates that the standard functionality remains the same.

Parts may behave and display uniformly in different contexts. For example, a part can be pinned to the startboard (one context) and preserve all the behaviors that they have in a blade (except for the ones that no longer make sense like 'pin to start'). FIG. 12 shows two different contexts 1201 and 1202. The part 1210 is shown with the same command menu (and other standard functionality) regardless of whether the part 1210 is within the context 1201 or the context 1202.

Accordingly, the principles described herein provide a model for presenting user interface elements with standard functionality, regardless of the context in which the parts are displayed. This allows consistent functionality even in composable systems in which multiple applications provide user interface parts to the system. Furthermore, resizing may be part of the standard functionality and may be limited to a predetermined number of sizes and shapes that allow for rational layout of the parts. In addition, resizing of the part affects the data that is projected into the part, and how that data is projected. Thus, the resizing is more intelligent than just making things larger and smaller.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:
   one or more processors; and
   one or more computer-readable storage media having stored thereon computer-executable instructions that are executable by the one or more processors to cause the computer system to visually manage a lifecycle of a resource, the computer-executable instructions including instructions that are executable to cause the computer system to perform at least the following:
   display a plurality of visualized container user interface elements on a screen as part of a portal user interface, each container user interface element being associated with a corresponding resource, being configured to manage a lifecycle of the corresponding resource, and being configured to be displayed using a predetermined number of different sizes, such that each visualized container user interface element is resizable to each of the predetermined number of different sizes, each different size being configured to display a different level of detail of data associated with the corresponding resource; and
   manage the lifecycle of a particular resource using a particular one of the plurality of visualized containers, including:
      displaying a visual representation associated with the particular resource within the particular visualized container using a first size of the particular visualized container that is configured to display a first level of detail of data associated with the particular resource, the first level of detail including a status indication of the particular resource indicating that the particular resource is not running, the visual representation also including one or more visual user interface controls for sending one or more commands to the particular resource, including a particular user interface control for sending a start command;
      based at least on receiving a user selection of the particular visual user interface control, sending a start command to the particular resource and updating the displayed status indication to indicate that the particular resource is starting; and
      once the particular resource has started, updating the visual representation of the particular resource within the particular visualized container using a second, different, size of the particular visualized container that is configured to display a second level of detail of data associated with the particular resource, the second level of detail including service data generated by the particular resource, when running.

2. The computer system in accordance with claim 1, the status indication being a blocking or non-blocking status.

3. The computer system in accordance with claim 1, the status indication being a progress indication.

4. The computer system in accordance with claim 1, the status indication being a failed status.

5. The computer system in accordance with claim 1, wherein the visual representation the visual representation includes a title displayed in a predetermined place.

6. The computer system in accordance with claim 5, the predetermined place being a first predetermined place, the visual representation including a subtitle displayed in a second predetermined place.

7. The computer system in accordance with claim 1, the status indication being a success status.

8. The computer system in accordance with claim 1, the status indication being a warning status.

9. The computer system in accordance with claim 1, the status indication being an error status.

10. The computer system in accordance with claim 1, wherein the second level of detail includes changing a form of presentation of the data associated with the particular resource.

11. The computer system in accordance with claim 10, wherein changing the form of presentation of the data comprises changing between a multimedia and a text format.

12. The computer system in accordance with claim 1, wherein updating the visual representation also comprises changing a shape of the visual representation.

13. A method, implemented at a computer system that includes one or more processors, for visually managing a lifecycle of a resource, the method comprising:
   presenting a plurality of visualized container user interface elements on a screen as part of a portal user interface, each container user interface element being associated with a corresponding resource, being configured to manage a lifecycle of the corresponding resource, and being configured to be displayed using a predetermined number of different sizes, such that each visualized container user interface element is resizable to each of the predetermined number of different sizes, each different size and shape being configured to display a different level of detail of data associated with the corresponding resource; and
   managing the lifecycle of a particular resource using a particular one of the plurality visualized containers, including:
      presenting a visual representation associated with the particular resource within the particular visualized container using a first size of the particular visualized container that is configured to display a first level of detail of data associated with the particular resource, the first level of detail including a status indication of the particular resource indicating that the particular resource is not running, the visual representation also including one or more visual user interface controls for sending one or more commands to the particular resource, including a particular user interface control for sending a start command;
      based at least on receiving a user selection of the particular visual user interface control, sending a start command to the particular resource and updating the status indication to indicate that the particular resource is starting; and
      once the particular resource has started, updating the visual representation of the particular resource within the particular visualized container using a second, different, size of the particular visualized container that is configured to display a second level of detail of data associated with the particular resource, the second level of detail including service data generated by the particular resource, when running.

14. The method in accordance with claim 13, wherein the second level of detail includes changing a form of presentation of the data associated with the particular resource.

15. The method in accordance with claim 14, wherein changing the form of presentation of the data comprises changing between a multimedia format and a textual format.

16. The method in accordance with claim 13, wherein updating the visual representation also comprises changing a shape of the visual representation.

17. A computer program product comprising one or more hardware storage devices having stored thereon computer-executable instructions that are executable by the one or more processors to cause the computer system to visually manage a lifecycle of a resource, the computer-executable instructions including instructions that are executable to cause the computer system to perform at least the following:
   render a plurality of visualized container user interface elements on a screen as part of a portal user interface, each container user interface element being associated with a corresponding resource, being configured to manage a lifecycle of the corresponding resource, and being configured to be displayed using a predetermined number of different sizes, such that each visualized container user interface element is resizable to each of the predetermined number of different sizes, each different size being configured to display a different level of detail of data associated with the corresponding resource; and
   managed the lifecycle of a particular resource using a particular one of the plurality visualized containers, including:
      rendering a visual representation associated with the particular resource within the particular visualized container using a first size of the particular visualized container that is configured to display a first level of detail of data associated with the particular resource, the first level of detail including a status indication of the particular resource indicating that the particular resource is not running, the visual representation also including one or more visual user interface controls for sending one or more commands to the particular resource, including a particular user interface control for sending a start command;
      based at least on receiving a user selection of the particular visual user interface control, sending a start command to the particular resource and updating the displayed status indication to indicate that the particular resource is starting; and
      once the particular resource has started, updating the visual representation of the particular resource within the particular visualized container using a second, different, size of the particular visualized container that is configured to display a second level of detail of data associated with the particular resource, the second level of detail including service data generated by the particular resource, when running.

18. The computer program product in accordance with claim 17, wherein the second level of detail includes changing a form of presentation of the data associated with the particular resource.

19. The computer program product in accordance with claim 18, wherein changing the form of presentation of the data comprises changing between a multimedia format and a textual format.

20. The computer program product in accordance with claim 17, wherein updating the visual representation also comprises changing a shape of the visual representation.

* * * * *